United States Patent [19]

Brichta et al.

[11] Patent Number: 4,666,947

[45] Date of Patent: May 19, 1987

[54] SELF-EXTINGUISHING COMPOSITIONS BASED ON ETHYLENE/VINYLACETATE COPOLYMERS SUITABLE FOR THE PREPARATION OF FOAMED ARTICLES

[75] Inventors: Corrado Brichta, Milan; Annibale Vezzoli, Arosio; Pietro Origgi, Milan, all of Italy

[73] Assignee: Montepolimeri S.p.A., Milan, Italy

[21] Appl. No.: 670,881

[22] Filed: Nov. 13, 1984

[30] Foreign Application Priority Data

Nov. 14, 1983 [IT] Italy ................................ 23705 A/83

[51] Int. Cl.⁴ .......................... C08J 9/14; C08K 5/06; C08K 5/03; C08L 31/04
[52] U.S. Cl. ........................................ 521/79; 521/88; 521/92; 521/94; 521/149; 524/208; 524/209; 524/259; 524/260; 524/371; 524/406; 524/408; 524/411; 524/469; 524/471; 524/486; 524/563
[58] Field of Search ............... 524/486, 563, 470, 469, 524/209, 259, 471, 371; 521/88, 149, 79

[56] References Cited

U.S. PATENT DOCUMENTS

| | | | |
|---|---|---|---|
| 3,420,786 | 1/1969 | Weber | 524/486 |
| 3,441,524 | 4/1969 | Burger | 524/486 |
| 3,668,155 | 6/1972 | Raley | 521/149 |
| 3,927,145 | 12/1975 | Gaeckel | 524/469 |
| 4,086,192 | 4/1978 | Raley | 524/470 |
| 4,323,655 | 4/1982 | Di Giulio | 521/88 |
| 4,430,467 | 2/1984 | Lesniewski | 524/486 |
| 4,443,575 | 4/1984 | Iwai | 524/486 |

FOREIGN PATENT DOCUMENTS

| | | | |
|---|---|---|---|
| 913827 | 10/1972 | Canada | 524/486 |
| 919856 | 1/1973 | Canada | 524/486 |

*Primary Examiner*—C. Warren Ivy

*Attorney, Agent, or Firm*—Stevens, Davis, Miller & Mosher

[57] ABSTRACT

Compositions based on ethylene/vinylacetate copolymers provided with self-extinguishing properties and suitable for the preparation of foamed materials, comprising for 100 parts by weight of the EVA copolymers:

from 5 to 10 parts by weight of at least a bromodiphenylether containing at least 3 bromine atoms;

from 2 to 4 parts by weight of a metal oxide selected from antimony, bismuth and tungsten oxides; and from 0.1 to 1 part by weight of a compound having general formula

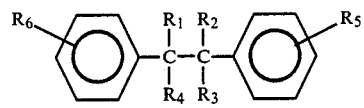

wherein $R_1$, $R_2$, $R_3$, $R_4$, equal or different from each other, can by hydrogen, chlorine, bromine, aliphatic hydrocarbon radicals containing from 1 to 6 carbon atoms, cyclohexyl or phenyl radicals, the nitro group or the —CN group.

$R_5$, $R_6$, equal or different, can be hydrogen, chlorine, bromine, aliphatic hydrocarbon radicals containing from 1 to 3 carbon atoms, or alkoxy radicals containing 1 to 4 carbon atoms or

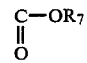

groups, $R_7$ being an alkyl radical containing from 1 to 3 carbon atoms.

5 Claims, No Drawings

SELF-EXTINGUISHING COMPOSITIONS BASED ON ETHYLENE/VINYLACETATE COPOLYMERS SUITABLE FOR THE PREPARATION OF FOAMED ARTICLES

BACKGROUND OF THE INVENTION

The use of foamed thermoplastic materials in the building and furnishings fields involves more and more serious safety problems as far as the flame reaction is concerned.

In particular, the foamed materials of polyolefins having low rigidity (less than approximately 1,400 kg/cm$^2$), especially ethylene-vinylacetate copolymers obtained by means of an extrusion-foaming process with physical foaming agents, have a very different flame reaction than that of the foamed materials of ethylene homopolymers of low density.

As a matter of fact, in spite of the addition of antiflame halogenated agents also in synergic combinations with Sb$_2$O$_3$ which provide olefins in general with satisfactory characteristics of self-extinction, it has not been possible to achieve self-extinguishing properties in the EVA copolymers used in the production of foamed materials with low density and having the softness required in the building field (sheaths for hot and cold water piping insulation, as well as sheets and slabs for insulation), and also in the furniture industry.

Therefore, the antiflame systems for polyolefins, comprising bromodiphenylethers in combination with antimony oxide, described, for example, in British Patent No. 874,006, are inadequate to impart extinguishing properties to EVA copolymers.

The same applies to the antiflame systems based on halogenated products and organic peroxides, used for styrol resins according to the British Pat. No. 877,864 and U.S. Pat. Nos. 3,058,926 and 3,124,557 as well as the methods described in Belgian Pat. No. 867,873 and in Japanese Application No. 76/134.762, according to which it is possible to obtain foamed polyolefinic products provided with self-extinguishing characteristics by performing reticulation of polymers with peroxides and successively foaming the same with chemical agents.

In the latter cases, it is possible to obtain products of very high density (exceeding 100 kg/m$^3$), which are non-soft and of higher cost than those prepared according to physical processes of extrusion-foaming.

Furthermore, the decomposition residues of the chemical foaming agents in this case negatively affect the aging resistance of the foamed materials themselves, particularly in contact with metals such as copper, etc.

We have now surprisingly found that it is possible to endow ethylene/vinylacetate copolymers with self-extinguishing properties and at the same time to obtain products suitable for the preparation of soft foamed materials of low density by using an antiflame system comprising one or more bromodiphenylethers containing at least 3 bromine atoms in their molecule, in combination with at least a metal oxide as hereinafter specified, and moreover, at least a compound (activator) having the general formula:

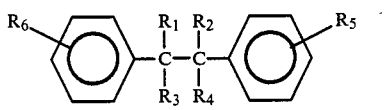

wherein: R$_1$, R$_2$, R$_3$, R$_4$, the same or different, can be hydrogen, aliphatic hydrocarbon radicals with 1 to 6 carbon atoms, chlorine, bromine, phenyl or cyclohexyl radicals, the nitro or the —CN group; R$_5$, R$_6$, the same or different, can be hydrogen, chlorine, bromine, aliphatic hydrocarbon radicals containing 1 to 3 carbon atoms, alkoxy radicals containing 1 to 4 carbon atoms, or

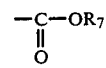

groups, R$_7$ being an aliphatic hydrocarbon radical containing 1 to 3 carbon atoms.

U.S. Pat. Nos. 3,441,524 and 3,420,786 have reported the use of diphenyl compounds included in aforesaid formula (I) in combination with bromide organic compounds, to provide the styrene polymers with antiflame characteristics. In this case, the antiflame effect is connected to the property of the diphenyl compounds of modifying the polymer structure at the combustion temperature in a way as to decrease its viscosity. The modified polymer tends to drip at such temperature conditions, with subsequent detachment of the flame from the polymeric material which thus stops burning.

The behavior of said diphenyl compounds in respect to ethylene/vinylacetate copolymers results, on the contrary, to be opposite to the behavior thereof with the styrene polymers in that at the combustion temperature of the copolymer, and generally at a temperature exceeding 200° C., said diphenyl derivatives modify the copolymer structure in a way that causes an increase in the copolymer viscosity and, therefore, at the aforesaid temperature conditions, no dripping of the copolymer occurs.

It is surprising, therefore, that it is possible to obtain antiflame effects in the ethylene/vinylacetate copolymers by the use of the aforementioned diphenyl derivatives.

Thus the object of the present invention concerns the self-extinguishing polymeric compositions comprising:
 (a) an ethylene/vinylacetate copolymer having a vinylacetate content of less than 50% by weight;
 (b) from 5 to 10 parts by weight, for 100 parts of copolymer, of at least a bromodiphenylether containing at least 3 bromine atoms in its molecule;
 (c) from 2 to 4 parts by weight for 100 parts of copolymer of a metal oxide selected from antimony trioxide, bismuth oxide and tungsten oxide, antimony trioxide being presently preferred;
 (d) from 0.1 to 1 part for 100 parts of copolymer of at least a compound included in the aforesaid general formula (I).

The ethylene/vinylacetate copolymer preferably contains from 8 to 10% by weight of copolymerized vinylacetate.

Bromodiphenylether is preferably present in amounts ranging between 6 and 8 parts by weight for 100 parts of the copolymer, while the compound of formula (I) is preferably present in amounts ranging between 0.4 to 0.8 parts by weight for 100 parts of the copolymer.

Examples of bromodiphenylethers useful in the practice of this invention are: tribromodiphenylether, tetrabromodiphenyl pentabromodiphenylether, hexabromodiphenylether, triether, bromochlorodiphenylether, tribromodichlorodiphenylether, tetrabromodichlorodiphenylether, octabromodiphenylether, decabromodiphenylether.

Examples of useful compounds (activators) of formula (I) are: 2,3-dimethyl-2,3-diphenylbutane, 2,3-diethyl-2,3-diphenylbutane, 2,3-dimethyl-2,3-di-p-tolybutane, 2,3-dimethyl-2,3-di-p-bromophenylbutane, 2,3-diethyl-2,3-di-p-chlorophenylbutane, 2,3-dimethyl-2,3-di-p-ethoxyphenylbutane, 2,2,3,3-tetraphenylbutane, 1,2-dibromo-1,2-dimethyl-1,2-diphenylethane, 1,2-dibromo-1,2-diphenylethane, 1,2-dinitro-1,2-diphenylethane, 1,2-dinitro-1,2-di-p-tolylethane, 2,3-dicyano-2,3-diphenylbutane, 1,2-dichloro-1,2-diphenylethane and mixtures of said compounds, 2,3-dimethyl-2,3-diphenylbutane being generally presently preferred.

The EVA copolymer utilized preferably has rigidity values ranging between 70 and 700 kg/cm$^2$, with Melt Flow Index (MFI) values ranging between 0.3 and 4.5 and preferably between 1.3 and 1.8/10 min. and density between 0.92 and 0.95 and preferably 0.928 g/cm$^3$.

Said EVA copolymers can also be used, for the objects of the present invention, in mixtures with up to 20% by weight, but preferably 5–10% by weight, of polyethylene at low, medium and high density, polypropylene, ethylene-propylene copolymers and ethylene-vinylchloride copolymers.

Anti-oxidizing agents, U.V. and metal stabilizers, lubricants, pigments, nucleants, and inert fillers of the kind conventionally used in such compositions can also be present in such copolymers or mixtures in amounts up to 3% by weight.

The self-extinguishing compositions according to the present invention are preferably granulated before the extrusion-foaming process.

The EVA resin in granulated form is additioned with the antiflame agents and the activators, the synergic agents and all the other additives, such as, for example, the nucleants, lubricants, anti-oxidizing agents, various stabilizers, pigments, antistatic agents, etc., and successively submitted to mixing in a mixer equipped with heating means, e.g., a Banbury mixer.

The homogenized mixture is calendered and the strip of the desired thickness is finally granulated.

In order to obtain good homogenization of the compositions according to the invention, in particular when anti-flame agents such as concentrated "masterbatches" are used, it is preferable to perform cold mixing (for example in a Henschel type mixer) and then to carry out granulation of the mixture by extrusion.

The self-extinguishing compositions thus obtained are particularly suitable for the production of closed-celled, soft, self-extinguishing foamed materials having low density and endowed with good dimensional stability by means of a conventional process of extrusion-foaming with physical foaming agents.

The physical foaming agents appropriate for the extrusion-foaming process are generally constituted by fluorocarbons, in particular dichlorotetrafluoroethane or fluorotrichloromethane, difluoridichloromethane, difluorochloromethane and their mixtures.

The following examples are reported in order to illustrate the invention in more detail and are not intended to be limiting.

For a preliminary evaluation of the flame reaction of the ethylene/vinylacetate (EVA) copolymers compositions with self-extinguishing properties according to the invention and to the examples reported, standard test pieces were prepared, starting from the relevant granulated compositions, by injection molding and were then subjected to the tests reported in the UL 94 specification (Underwriters Laboratories, Inc.).

The test pieces obtained from compositions according to the invention proved to have specified extinction times as provided for the class V O.

The foamed materials obtained by the extrusion-foaming process were, on the contrary, subjected to the flame reaction test provided for in the German specification DIN 4102, Class B.2. The test method under the specification DIN 53438 was used for this evaluation.

EXAMPLE 1

(reference composition)

100 parts by weight of resin base consisting of ethylene/vinylacetate copolymer (tradename Baylon V 10 H 460, produced by Bayer AG, vinylacetate content: 8.5%, effective density: 0.928 g/cm$^3$, Melt Flow Index according to DIN 53735: 1.5, were uniformly mixed (in a mixer) with 1.5 parts by weight of zinc stearate, with 0.8 parts by weight of talc and 0.1 part of phenol anti-oxidizing agent containing sulphur (trade name: Irganox 1035 of Ciba-Geigy) and were then additioned with 7.2 parts by weight of decabromodiphenylether and 2.4 parts of Sb$_2$O$_3$.

The mixture was granulated in a single-screw extruder (L/D=25, screw diameter=60 mm, at temperatures of 130°–160° C.).

Irganox 1035, (registered trandemark), is 2,2'-thiodiethyl-[3-(3,5-di-tertbutyl-4-hydroxyphenyl)propionate].

Standard test pieces according to the UL (94-V.) specification were prepared from the granulated mixture by injection molding. The results relating to the extinction times obtained in the flame reaction tests according to the above mentioned specifications and reported in Table 1, proved that the test pieces burnt completely and, therefore, said reference composition was not endowed with the necessary self-extinguishing properties.

The flame reaction of a foamed material obtained from the reference composition by a conventional extrusion-foaming process was also determined.

For this purpose, the reference composition granulate was placed in a double-screw extruder LMP-RC 27 (L/D=16.6; D=90 mm), equipped with an extrusion die having internal diameter outlet section of 10.5 mm and external diameter of 13.5 mm. The injection of 30 parts by weight of physical foaming agent consisting of dichlorotetrafluoroethane took place at approximately one third of the screw length. The temperature of the outflowing molten material was approximately 95° C.

The foamed tubular material had the following characteristics: internal diameter=40 mm, external diameter=55 mm, density=38 kg/m$^3$.

Test pieces having standard dimensions were obtained from the foamed tubular material and subjected to the flame tests according to the German specification DIN 53438 for the class B 2.

Table 1 reports the values of the combustion times, which show that the test pieces did not get through the specifications provided for class B 2 and, therefore, the reference composition did not possess the necessary characteristics of self-extinction.

EXAMPLE 2

The composition described in the Reference Example 1 was additioned with 0.6 parts by weight of 2,3-dimethyl-2,3-diphenylbutane (trade name Interox CC DFB produced by Peroxyd-Chemie G.m.b.H.), after which granulation was carried out.

Table 1 reports the extinction times of the relevant test-pieces obtained according to the specification UL (94-V) and the combustion times of the foamed test pieces determined according to the specification DIN 53438.

The results of the flame reaction proved that the composition according to the invention was endowed with the necessary properties of self-extinction and that the foamed material was according to the specifications provided for class B 2.

EXAMPLE 3 100 parts by weight of resin base consisting of ethylenevinylacetate copolymer (trade name Elvax 760 produced by Du Pont de Nemours; vinylacetate content: 9.3%; effective density: 0.93 g/cm$^3$; Melt Flow Index according to DIN 53735: 2.0) were additioned with 10 parts by weight of polyethylene homopolymer of low density (Baylon 23 L 430, produced by Bayer AG; effective density: 0.923 g/cm$^3$; Melt Flow Index according to DIN 53735: 3.8), then mixing was performed adding 1.5 parts by weight of zinc stearate, 0.8 part of talc and 0.1 part of phenol anti-oxidizing agent (Irganox 1035). Finally, 13.2 parts by weight of an anti-flame Masterbatch were added (80% concentration of EVA resin base having 19% content by weight of Sb$_2$O$_3$; 56 b.w. of decabromodiphenylether and 5% b.w. of 2,3-dimethyl-2,3-diphenylbutane). A mixture having the following composition, expressed in parts by weight, was obtained:

| | |
|---|---|
| ethylene/vinylacetate copolymer | 100. |

-continued

| | |
|---|---|
| polyethylene | 10. |
| Irganox 1035 | 0.1 |
| decabromodiphenylether | 7.4 |
| Sb$_2$O$_3$ | 2.5 |
| 2,3-dimethyl-2,3-diphenylbutane | 0.65 |
| zinc stearate | 1.5 |

The standard test pieces to be subjected to the flame reaction according to the specification UL (94-V) were prepared by injection molding from the granulated mixture and the foamed test pieces (sheaths) to be subjected to the flame reaction according to the specification DIN 53438 were also prepared by the extrusion-foaming process.

The results of the extinction and combustion times reported in Table 1 prove that the composition according to the invention was endowed with the fire self-extinguishing properties required.

EXAMPLES 4–9

The composition described in the Reference Example 1 was additioned in turn with the specific amounts of activators reported in Table 1.

The relevant extinction and combustion times of the compositions according to the invention proved that all the compositions containing activators according to this invention possessed the required characteristics of self-extinction.

Where ranges are given herein, the extremes are included.

TABLE 1

| Ex. | ACTIVATOR | % b.w. on EVA Copolymer | Extinction Time (UL94) Seconds | Combustion Time NE (DIN 53438) Seconds | Class |
|---|---|---|---|---|---|
| 1 (ref) | — | — | burns completely | burns completely | — |
| 2 | ⌬−C(CH$_3$)$_2$−C(CH$_3$)$_2$−⌬ | 0.6 | 2 | 6 | B 2 |
| 3 | As in Ex. 2 | 0.6 | 3 | 7 | B 2 |
| 4 | H$_5$C$_2$O−⌬−C(CH$_3$)$_2$−C(CH$_3$)$_2$−⌬−OC$_2$H$_5$ | 0.6 | 5 | 8 | B 2 |
| 5 | Br−⌬−C(CH$_3$)$_2$−C(CH$_3$)$_2$−⌬−Br | 0.4 | 4 | 6 | B 2 |
| 6 | ⌬−C(CH$_3$)(CH$_2$CH$_3$)−C(CH$_3$)(CH$_2$CH$_3$)−⌬ | 0.7 | 3 | 5 | B 2 |

TABLE 1-continued

| Ex. | ACTIVATOR | % b.w. on EVA Copolymer | Extinction Time (UL94) Seconds | Combustion Time NE (DIN 53438) Seconds | Class |
|---|---|---|---|---|---|
| 7 | (structure: 2,3-dimethyl-2,3-diphenylbutane with extra phenyls) | 0.5 | 5 | 7 | B 2 |
| 8 | (structure: 1,2-dibromo-1,2-dimethyl-1,2-diphenylethane) | 0.5 | 4 | 4 | B 2 |
| 9 | (structure: 1,2-dinitro-1,2-diphenylethane) | 0.8 | 4 | 5 | B 2 |

What is claimed is:

1. A composition for the preparation of foamed materials endowed with self-extinguishing properties, said composition consisting essentially of:
    (a) 100 parts by weight of ethylene/vinylacetate copolymer having a copolymerized vinylacetate content less than 50% by weight;
    (b) 5-10 parts by weight of deca-bromdiphenylether;
    (c) 2-4 parts by weight of a metal oxide selected from the group consisting of antimony trioxide, bismuth oxide and tungsten oxide;
    (d) 0.1-1 part by weight of at least one compound having the general formula

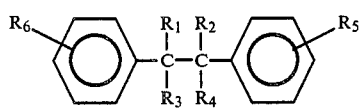

(I)

wherein
$R_1$, $R_2$, $R_3$, $R_4$, the same or different, are selected from the group consisting of hydrogen, chlorine, bromine, aliphatic hydrocarbon radicals containing 1-6 C atoms, the phenyl radical, the cyclohexyl radical, the —CN group and the nitro group; $R_5$, $R_6$, the same or different, are selected from the group consisting of hydrogen, chlorine, bromine, aliphatic hydrocabon radicals containing 1-3 C atoms and alkoxy radicals containing 1-4 C atoms.

2. A composition according to claim 1, in which the ethylene/virylacetate copolymer contains 8-10% by weight of copolymerized vinylacetate.

3. A composition according to claim 1, in which decabromodiphenylether is present in amounts ranging from 6 to 8 parts by weight.

4. A composition according to claim 1, in which the compound (d) is present in amounts ranging from 0.4 to 0.8 parts by weight and is selected from the group consisting of
2,3-dimethyl-2,3-diphenylbutane;
2,3-dimethyl-2,3-di-p-ethoxyphenylbutane;
2,2,3,3-tetraphenylbutane;
1,2-dibromo-1,2-dimethyl-1,2-diphenylethane; and
1,2-dinitro-1,2-diphenylethane.

5. In a process for manufacturing self-extinguishing foamed materials based on an olefinic polymer or copolymer, which process comprises the extrusion-expansion, in the presence of physical blowing agents, of a self-extinguishing composition containing said polymer or copolymer, a brominated compound, a metal oxide and an activator, the improvement characterized in that said self-extinguishing composition consists essentially of:
    (a) 100 parts by weight of an ethylene-vinylacetate copolymer having a copolymerized vinylacetate content lower than 50% by weight;
    (b) 5-10 parts by weight of deca-bromodiphenylether;
    (c) 2-4 parts by weight of a metal oxide selected from the group consisting of antimony trioxide, bismuthoxide and tungsten oxide;
    (d) 0.1-1 part by weight of at least one compound having the formula:

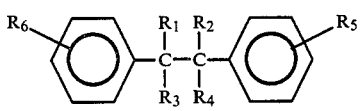

(I)

wherein
$R_1$, $R_2$, $R_3$, $R_4$, the same or different, are selected from the group consisting of hydrogen, chlorine, bromine, aliphatic hydrocarbon radicals containing 1-6 C atoms, the phenyl radical, the cyclohexyl radical, the —CN group and the nitro group, and wherein $R_5$, $R_6$, the same or different, are selected from the group consisting of hydrogen, chlorine, bromine, aliphatic hydrocarbon radicals containing 1-3 C atoms and alkoxy radicals containing 1-4 C atoms.

* * * * *